United States Patent [19]

McIver, Jr.

[11] Patent Number: 4,535,235

[45] Date of Patent: Aug. 13, 1985

[54] APPARATUS AND METHOD FOR INJECTION OF IONS INTO AN ION CYCLOTRON RESONANCE CELL

[75] Inventor: Robert T. McIver, Jr., Irvine, Calif.

[73] Assignee: Finnigan Corporation, San Jose, Calif.

[21] Appl. No.: 492,473

[22] Filed: May 6, 1983

[51] Int. Cl.³ .............................................. B01D 59/44

[52] U.S. Cl. ..................................... 250/282; 250/291

[58] Field of Search ............... 250/281, 282, 290, 291, 250/292, 423 R

[56] References Cited

U.S. PATENT DOCUMENTS

| | | | |
|---|---|---|---|
| 2,633,539 | 3/1953 | Altar | 250/290 |
| 3,475,605 | 10/1969 | Llewellyn | 250/291 |
| 3,937,955 | 2/1976 | Comisarow | 250/291 |
| 4,189,640 | 2/1980 | Dawson | 250/290 |

*Primary Examiner*—Bruce C. Anderson
*Attorney, Agent, or Firm*—Flehr, Hohbach, Test, Albritton & Herbert

[57] ABSTRACT

A mass spectrometer having an ion cyclotron resonance analyzer cell disposed in a homogenous magnetic field with an ionizer outside the magnetic field for forming ions to be analyzed in the cell and an interface for introducing ions from said ionizer into said ion cyclotron resonance cell for analysis.

13 Claims, 4 Drawing Figures

APPARATUS AND METHOD FOR INJECTION OF IONS INTO AN ION CYCLOTRON RESONANCE CELL

This invention relates generally to spectroscopy and more particularly to a spectrometer in which externally created ions are injected into the ion cyclotron resonance cell.

Ion cyclotron resonance is well known and has been employed in numerous spectroscopy devices and studies. The ion cyclotron resonance technique and apparatus provides a sensitive and versatile method for detecting gaseous ions. It is well known that a moving gaseous ion in the presence of a uniform static magnetic field is constrained to move in circular orbits in the plane perpendicular to the field and is unrestrained in its motion parallel to the field. The frequency of the circular motion is directly dependent upon the charge-to-mass ratio of the ion and the strength of the magnetic field. When the orbiting ions are subjected to an oscillating electric field disposed at right angles to the magnetic field, those ions having a cyclotron frequency equal to the frequency of the oscillating electric field are accelerated to increasingly larger orbital radii and higher kinetic energy. Because only the resonant ions absorb energy from the oscillating electric field, they are distinguished from nonresonant ions upon which the oscillating electric field has substantially a negligible effect.

Various methods of and apparatus for taking advantage of the foregoing phenomena and utilizing it to measure the number of ions having a particular resonant frequency have been proposed and are in use. These devices are generally referred to as ion cyclotron resonance mass spectrometers.

In the omegatron type of ion cyclotron resonance mass spectrometer, gaseous ions are generated inside the device by bombardment of a gaseous sample with electrons. These ions are subjected to mutually perpendicular magnetic and oscillating electric fields and, as described above, those ions which are in resonance with the frequency of the oscillating electric field are accelerated to larger velocities and orbital radii. Such resonant ions ultimately impinge upon a collector plate, and the resulting ion current is measured and recorded. The mass spectrum of a sample to be analyzed may be scanned by varying either the frequency of the oscillating electric field or the strength of the magnetic field, or both, so as to bring ions of differing mass-to-charge ratio into resonance with the oscillating electric field and cause them to impinge upon the collector plate.

In another type of ion cyclotron resonance mass spectrometer, ions having a resonant frequency equal to the frequency of the oscillating electric field are accelerated and the resultant power absorbed from the electric field is measured. The measured power is related only to the resonant ions, and not to ions having other cyclotron frequencies. An ion cyclotron resonance mass spectrometer utilizing such a resonance absorption detecting means is disclosed in U.S. Pat. No. 3,390,265 entitled "Ion Cyclotron Resonance Mass Spectrometer Having Means for Detecting the Energy Absorbed by Resonance Ions" issued to Peter M. Llewellyn on June 25, 1968. It is important to note that the multiplicity of regions for forming and analyzing the ions are all within the homogenous magnetic field. The gas sample is ionized continuously within a first region of the cell. The ions thus produced are subjected to transverse magnetic and static electric fields. These fields move the ions along cycloidal paths in a direction perpendicular to both fields in a well known manner to a second region of the cell removed in space from the first region. In the second region, the ions are subjected to the combined influence of the magnetic field and a perpendicular oscillating electric field. Ions of a given mass-to-charge ratio in resonance with the oscillating electric field are accelerated and the absorbed energy is detected to provide a measure of the number of the resonant ions. Other U.S. patents disclosing various related ion cyclotron resonance mass spectrometers methods and apparatus, and improvements thereto are: 3,446,957; 3,475,605; 3,502,867; 3,505,516; 3,505,517; 3,511,986; 3,535,512; 3,677,642.

A different type of ion cyclotron resonance mass spectrometer is disclosed in U.S. Pat. No. 3,742,212 entitled "Method and Apparatus for Pulsed Ion Cyclotron Resonance Spectroscopy" issued to Robert T. McIver, Jr. on June 26, 1973. The spectrometer disclosed in this patent includes a single section ion cyclotron resonance cell and a pulsed mode of operation. A gas sample is ionized within the cell by means such as a pulse of an electron beam. The ions are subjected to a combined action of a plurality of static electric fields and a magnetic field thereby trapping the ions and causing them to move orbitally within the cell. After a known delay period, ions are detected by measuring the power they absorb from an oscillating electric field perpendicular to the magnetic field. The ions are then removed from the cell by altering the voltages applied to the plates of the cell. The total operation sequence (ion formation, delay period, ion cyclotron resonance detection, and ion removal) is then repeated. This apparatus provides much higher mass resolution than the omegatron or the multiple region cell because ions can be stored for extended periods of time.

Two U.S. patents for improvements of the single-section ion cyclotron resonance cell have been issued. U.S. Pat. No. 4,105,917 entitled "Method and Apparatus for Mass Spectrometric Analysis at Ultra-Low Pressures" was issued to Robert T. McIver, Jr. and E. B. Ledford, Jr. on Aug. 8, 1978. This patent discloses an improved ion cyclotron resonance cell consisting of four electrodes in the form of a rectangular hyperbola to produce a homogeneous quadrupolar electrostatic field and two sets of wires for subjecting ions in the cell to an oscillating electric field. Resonant ions formed within the homogeneous magnetic field are accelerated by the oscillating electric field until they impinge on the upper and lower electrodes, and the resulting ion current is measured and recorded. The apparatus is particularly useful for chemical ionization experiments at low pressures because reagent ions are stored for several seconds.

One of the major disadvantages of all the above noted prior art ion cyclotron resonance methods and apparatus is that ion cyclotron resonance detection is limited to a single frequency (and therefore a single mass-to-charge ratio) at any instant in time. In order to obtain a complete mass spectrum it is necessary to scan either the magnetic field strength or the frequency of the oscillating electric field so as to achieve resonance of the various ions with the oscillating electric field. Several minutes are required, typically, to complete a single scan. These limitations are overcome by a Fourier transform ion cyclotron resonance (FT-ICR) detection scheme which is disclosed in U.S. Pat. No. 3,937,953 entitled "Fourier Transform Ion Cyclotron Resonance Spectroscopy and Method". With the Fourier transform ion cyclotron resonance method ions are formed within a single section ion cyclotron resonance cell positioned in a homogeneous magnetic field, are excited with a broad-band oscillating electric field pulse, and their cyclotron motion is detected with a broad-band amplifier. Fourier transformation of the signals from the broad-band amplifier provides a complete mass spectrum. Development of ion cyclotron resonance methods over the last two decades has produced techniques with some powerful features. These include: (1) very high mass resolution, exceeding to the best double focusing sector mass spectrometers; (2) high mass measurement accuracy; (3) rapid data acquisition owing to the Fourier technique for simultaneously detecting all ions; (4) high ion detection efficiency, owing to the open geometry and absence of slits in the single region cell; (5) powerful methods for elucidating the structures of ions, such as collision activated dissociation and laser photodissociation; and (6) inexpensive fabrication since mechanical tolerances are not critical.

In spite of these many advantages, ion cyclotron resonance spectrometers have not found wide acceptance for analytical applications owing to a number of serious limitations and shortcomings. The main problem is that the general performance of the instrument, its mass resolution and detection sensitivity, degrade seriously if the pressure in the ion cyclotron resonance cell exceeds about $1\times10^{-6}$ torr.

Evacuating an ion cyclotron resonance cell to low pressure is difficult because pumping at the cell is severely constricted by the magnet which must surround the cell. Typically only relatively low gas flow into an ICR cell can be accommodated if the resolution and sensitivity of the instrument are not to be sacrificed. Prior to this invention the described pressure and flow limitations precluded the effective use of important sample ionization techniques such as high pressure chemical ionization, and large particle bombardment ionization (SIMS, FAB, etc.) and equally important sample separation and introduction techniques such as liquid chromatography and gas chromatography. All of these techniques, when applied to the conventional FT-ICR apparatus, result in high pressures in or high gas flows into the analyzer cell region. Reducing these pressures or flows to acceptable levels means reducing sample flow and hence sensitivity.

Formation of ions within the ion cyclotron resonance (ICR) cell represents another serious limitation of ICR spectroscopy. An ICR cell can contain only a certain number of ions before their space charge seriously degrades the performance of the cell. This reduces the ability to detect trace level components in sample mixtures.

An object of this invention is the provision of a method of and apparatus for ion cyclotron resonance spectroscopy which overcome the above-mentioned shortcomings and difficulties of the prior art.

Another object of this invention is the provision of an ion cyclotron resonance analyzer cell and method of utilizing the same in which ions are injected into the cell parallel to the applied magnetic field and trapped in the cell for relatively long time periods during which mass spectrometry, ion-molecule reactions, collision activated dissociation, photodissociation, and other studies involving ions may be performed.

A further object of this invention is to provide an ion cyclotron resonance spectrometer and method having high mass resolution and sensitivity that can be interfaced to a gas chromatograph, liquid chromatograph, ion bombardment source or other device at elevated pressures.

Another object of this invention is to provide a multiplicity of electrodes with applied alternating and static voltages to guide a beam of ions from an ion source external of the magnetic field, through the fringing fields and into an ion cyclotron resonance cell situated in the magnetic field.

Still another object of this invention is to provide a series of electrodes and method of utilizing the same whereby a beam of ions injected into an ion cyclotron resonance cell and decelerated to an energy low enough for the ions to be trapped in the cell.

Another object of the invention is to provide a multiplicity of electrodes with applied alternating and static voltages or magnetic fields to guide a beam of mass, momentum or energy selected ions originating external of the ICR magnetic field into an ion cyclotron resonance cell disposed within the magnetic field.

It is a further object of the invention to provide a means for selectively injecting ions of trace level components into an ICR cell and accumulating them in the cell until a sufficient quantity is available for ion cyclotron resonance detection.

A further object of this invention is the provision of a method and apparatus for ion cyclotron double resonance spectroscopy whereby a pulsed valve injects gas into an ion cyclotron resonance cell, and ions subjected to a short pulsed oscillating electric field are accelerated and subsequently collide with the added gas and caused to fragment.

Still another object of this invention is the provision of a method for using a pulsed value to inject a buffer gas such as helium into the ion cyclotron resonance cell so that a high energy beam of ions may collide and be slowed sufficiently for the ions to be trapped in the cell.

A further object of this invention is the provision of a method for sequential fragmentation of ions brought in and stored in the ion cyclotron resonance cell. A typical sequence of events is for a first excitation source (such as a laser or ion cyclotron double resonance pulse) to fragment parent ions forming daughter ions, the daughter ions are detected by the ion cyclotron resonance method, then a second excitation pulse fragments daughter ions forming granddaughter ions, then the granddaughter ions are detected by the ion cyclotron resonance method. This sequential process can be continued several times until only low mass fragment ions remain. The foregoing and other objects of the invention may be more clearly understood by the following description and accompanying drawings in which:

Figure 1:
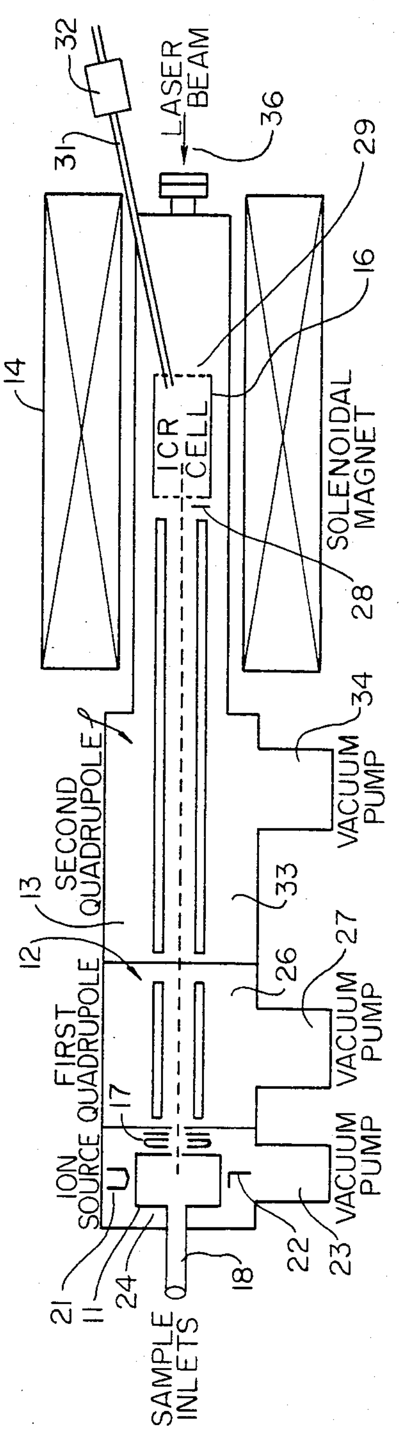
FIG. 1 is a schematic view of axial injection of ions in a tandem quadrupole mass filter and ion cyclotron resonance spectrometer.

The tandem quadrupole mass filter and ion cyclotron mass spectrometer, FIG. 1, comprises an ion source 11, a quadrupole mass filter 12, a second quadrupole mass filter 13 for guiding ions through the fringing fields of the ion cyclotron solenoid magnet 14, and a single-region ion cyclotron resonance cell 16. At this time it is to be understood that magnet 14 functions to provide a uniform (e.g., homogeneous) magnetic filed which is at least sufficiently large to incorporate cell 16. As will be seen hereafter, in accordance with one aspect at one present invention, ion source 11 is disposed outside of this homogeneous field, although it could be located within the fringing field (e.g., the nonhomogenous field of the magnet). The filter 13 serves to introduce the ions from source 11 into the homogeneous field, allowing the ions to easily enter the cell.

Ions are formed in the ion source region of the quadrupole mass spectrometer and are focused into a beam which is accelerated into the first set of quadrupole rods by the focusing electrodes 17. There may be several inlet ports 18 interfaced to the ion source region of the quadrupole mass spectrometer. These may include introduction of the effluent from a gas chromatograph or a liquid chromatograph, a direct insertion probe for low volatility samples, or a batch gas inlet. In addition, various well known sample ionization techniques such as electron impact, fast atom bombardment, laser desorption and laser multiphoton ionization may be used in the ion source to generate gaseous ions. In FIG. 1 electron impact ionization is shown with electron source 21 and collector 22.

Figure 2:
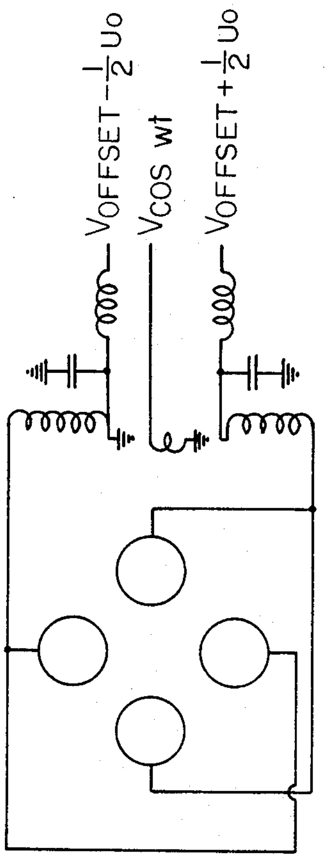
FIG. 2 is a view showing typical operating voltages applied to the electrodes of the quadrupole mass filters shown in FIG. 1.

The first quadrupole mass filter could be operated either in the RF mode to pass ions within a large mass range or in the RF-DC mode, FIG. 2, to pass only ions within a certain limited range of mass-to-charge ratio. Since the ion source is physically separate from the ion cyclotron resonance cell and solenoidal magnet, a large vacuum pump can be mounted close to the ion source to reduce the pressure caused by the ionizing technique or sample. This is illustrated by the connector 23. The pressure within the region 24 may be on the order of $10^{-3}$ Torr. A second vacuum pump can be mounted adjacent to the first quadrupole 12 to further reduce the pressure in the region 26. This is illustrated by the connector 27. The pressure in this region is about $10^{-5}$ Torr. The main purposes of this part of the apparatus are to reduce the pressure in the manifold and to allow only ions of a predetermined mass-to-charge ratio to pass into the next region of the tandem spectrometer.

Next the ion beam enters second quadrupole rod assembly 13 which utilizes alternating electric fields, FIG. 2, to focus the ions at the center of the four rods. The purpose of this assembly is to guide the ions through the inhomogeneous region of the solenoidal magnet, e.g., the fringing field. In the absence of this second quadrupole assembly the ions could not readily penetrate into the magnetic field because of an effect called the magnetic mirror principle. However, the strong electric fields of the second quadrupole assembly are able to overcome the retarding force of the magnetic field and enable the ions to pass into the center of the solenoid. The second quadrupole assembly could be operated in either the RF mode or the RF-DC mode. The RF or AC mode is preferable because it provides much higher transmission efficiency for the ion beam. The pressure in the ion cyclotron resonance region 33 of the cell can be pumped down to extremely low pressures by a pump connected to connector 34. The pressure can be as low as $10^{-8}$ Torr or lower. This permits good resolution and sensitivity.

Figure 3:
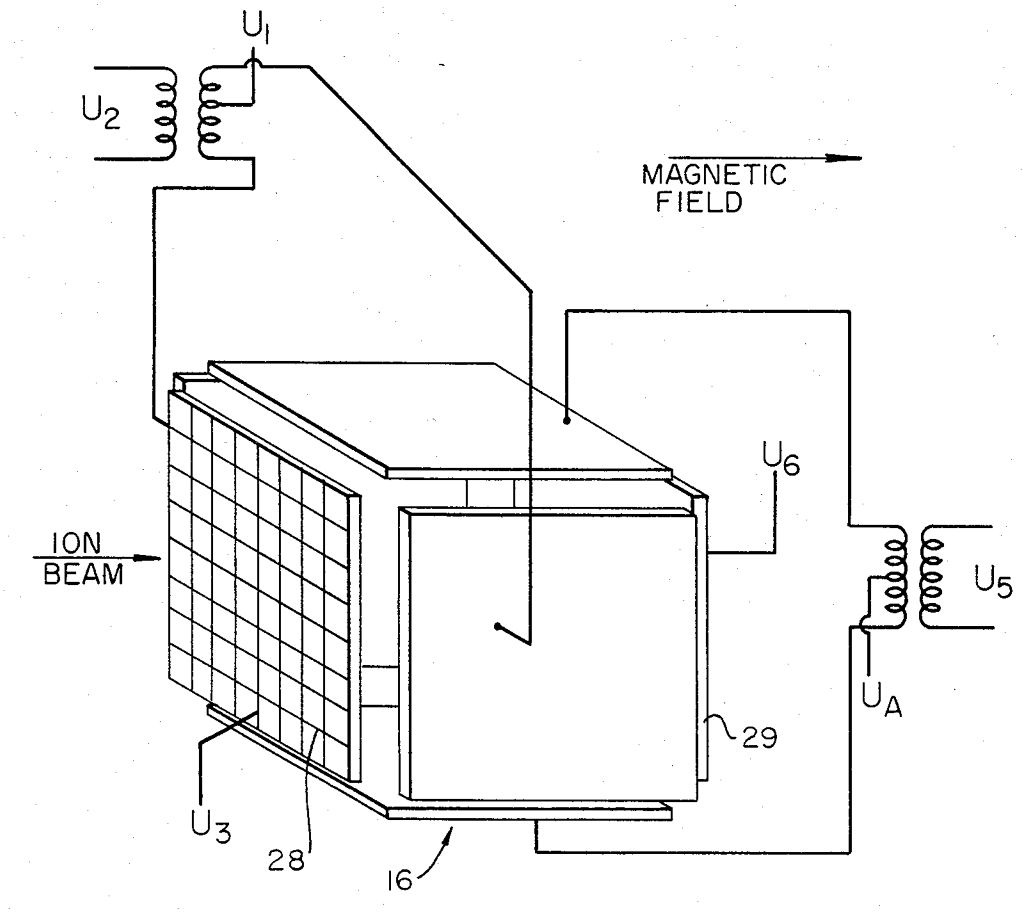
FIG. 3 is a perspective view of the ion analyzer cell shown in FIG. 1.

An ion cyclotron resonance cell 16 is mounted at the center of the solenoidal magnet. The cell is similar to the single-region cell disclosed by McIver in U.S. Pat. No. 3,742,212 and is shown schematically in FIG. 3. However, the trapping plates, the electrode 28 perpendicular to the magnetic field, should be made with an aperture or of fine wire mesh instead of solid metal so that the ion beam can pass through the plate, in the axial direction of the magnetic field, and into the center of the cell. The electrodes of the ion cyclotron resonance cell are biased with DC voltages U1, U3, U4 and U6 appropriate for storing either positive or negative ions, and AC voltage U2 can be applied to excite the cyclotron resonance motion of the ions. The coherent motion of the excited ions induces the detected signal voltage U5.

Figure 4:
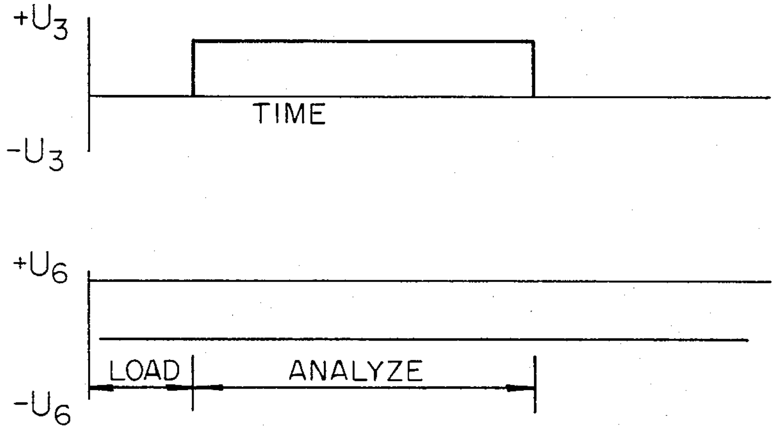
FIGS. 4A and 4B show the trapping voltages applied to the ion analyzer cell during operation of the tandem quadrupole mass filters and ion cyclotron resonance mass spectrometer.

As the ion beam moves through the two quadrupole rod assemblies it will have excessive kinetic energy, perhaps as great as several electron volts. This energy must be removed, however, in order for the ions to be trapped in the ion cyclotron resonance cell. One method for slowing the ions down is to bias the entire ion cyclotron resonance cell at a potential just slightly lower than the energy of the ion beam. Thus a 5 eV ion beam would be deaccelerated if the ion cyclotron resonance cell were biased at +5 V DC relative to the rest of the apparatus. Another method would be to bias the end plate 29 with voltage $U_6$ such as to repel the ion beam and lower the voltage on the plate 28, $U_3$ to allow passage of the beam. This is shown by the "load" time in FIG. 4. Thereafter the voltage is raised to trap the ions for analysis, "analyze" in FIG. 5. The sequence can then be repeated as desired. Another method to slow the ions is to add a buffer gas such as helium to the ion cyclotron resonance cell via inlet 31 to a pressure high enough so that the ions collide inelastically with the gas as they enter the cell. A pulsed valve 32 could be gated on to add buffer gas and then gated off so that the buffer gas could be pumped away. A third approach is to rely on the magnetic mirror effect to slow the axial velocity of the ions as they pass through the inhomogeneous region of the magnetic field.

Once the ions are stored in the ion cyclotron resonance cell, all the conventional Fourier transform ion cyclotron resonance experiments, collision activated dissociation, laser photodissociation experiments and other experiments known in ion cyclotron resonance spectroscopy can be performed.

There are several advantages to this method. First, the ion cyclotron resonance cell is not overloaded with extraneous ions because the quadrupole filters out ions which are not of interest. Space charge effects are thereby avoided and the full dynamic range of the cyclotron resonance detector can be used for the ions of importance. Second, the ion cyclotron resonance cell can be maintained in an ultra-high vacuum chamber 33. The high pressures associated with the sample separation and ionization methods are handled in the source of the quadrupole mass spectrometer and separate pumps can be used to maintain the pressure in the ion cyclotron resonance cell at a low value, e.g. $10^{-9}$ Torr. Third, ions can be stored for several minutes when the pressure in the ion cyclotron resonance cell is kept low. This permits a sequence of experiments to be performed on the same set of ions. Such experiments will be very useful in determining the structures of ions because the ions can be sequentially broken apart into smaller and smaller fragments by several laser beam pulses 36 or high energy ion-molecule collisions.

Thus, there has been provided an improved mass spectrometer which permits ion cyclotron mass spectroscopy with samples which present large gas loads. The spectrometer of the present invention provides a method and apparatus for introducing ions into the ion analyzer cell which is maintained at low pressures. This results in a high resolution, high detection sensitivity mass spectrometer when used with modern ionization and mixture separation techniques.

What is claimed is:

1. A mass spectrometer including (a) an ion cyclotron resonance cell disposed in a homogeneous magnetic field;

(b) means located outside said uniform magnet field for ionizing a sample to be analyzed to form sample ions;

(c) filter means for selectively introducing sample ions from the ionizing means into the ion cyclotron resonance cell from said location outside said uniform magnetic field; and (d) means for accelerating ions in said ion cyclotron resonance cell for detection of said introduced sample ions.

2. A mass spectrometer as in claim 1 wherein said filter means for selectively introducing sample ions into the ion cyclotron resonance cell comprises at least one quadrupole mass filter having a rod assembly which extends into or extends in close proximity to the homogeneous magnetic field and means for introducing sample ions from the ionizing means into said quadrupole filter whereby the ions are directed into the ion analyzer cell by said quadrupole mass filter means.

3. A mass spectrometer as in claim 2 wherein said homogeneous magnetic field extends beyond said cell and wherein said filter extends into the part of said homogeneous field outside said cell.

4. A mass spectrometer as in claim 1 including mass selection means disposed between the ionizing means and filter means for selectively introducing the sample ions into the ion cyclotron resonance cell.

5. A mass spectrometer as in claim 4 in which said mass selection means comprises a quadrupole section operated with both RF and DC voltages and in which said ion introducing means include a second quadropole section operated with RF voltages.

6. A mass spectrometer as in claim 1 in which said means for ionizing the sample comprises an electron beam for ion impact ionization.

7. A mass spectrometer as in claim 1 in which said means for ionizing comprises particle bombardment.

8. A mass spectrometer as in claim 1 in which said means for ionizing comprises laser ionization.

9. A mass spectrometer as in claim 1 in which said means for ionizing comprises high pressure chemical ionization.

10. A mass spectrometer as in claim 1 in which said means for ionizing comprises thermal ionization.

11. A mass spectrometer as in claim 1 in which said means for accelerating ions comprise means for performing Fourier transform ion cyclotron resonance analysis.

12. A mass spectrometer as in claim 2 in which means are provided for trapping said ions in said ion analyzer cell after they are introduced into the cell.

13. The method of conducting ion cyclotron resonance analysis of samples in an ion resonance spectrometer including an ion analyzer cell which comprises the steps of ionizing the sample outside of the homogeneous magnetic field associated with the spectrometer, selecting ions in a predetermined mass range and introducing into the analyzer cell the selected ionized atoms.

* * * * *